No. 820,790. PATENTED MAY 15, 1906.
M. H. JOHNSON.
VOTING MACHINE.
APPLICATION FILED NOV. 18, 1902.
5 SHEETS—SHEET 1.
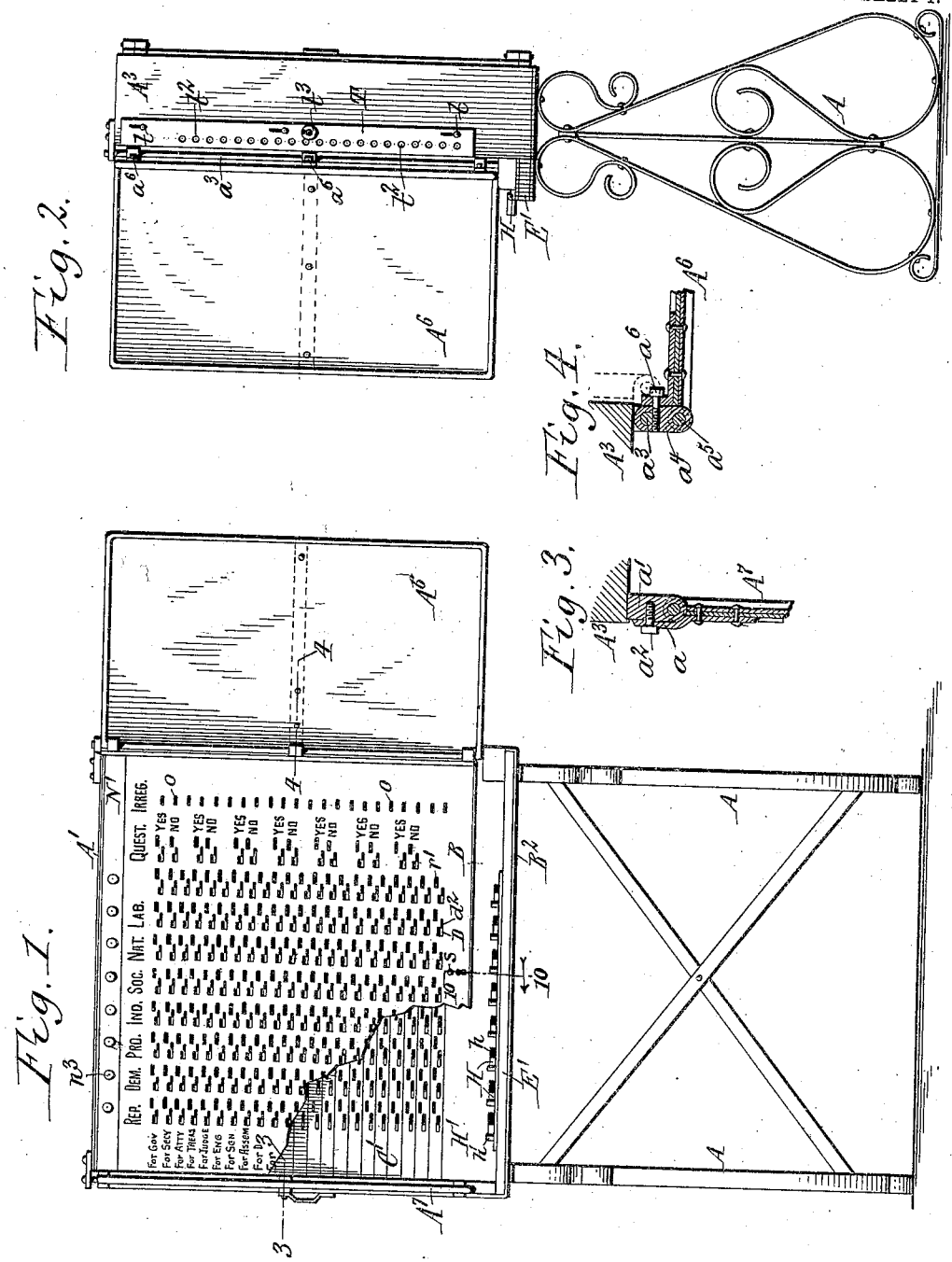
Witnesses:
Robert Weitknecht.
Emma M. Graham.
M. H. Johnson,
Inventor
By Geyer & Popp
Attorneys.

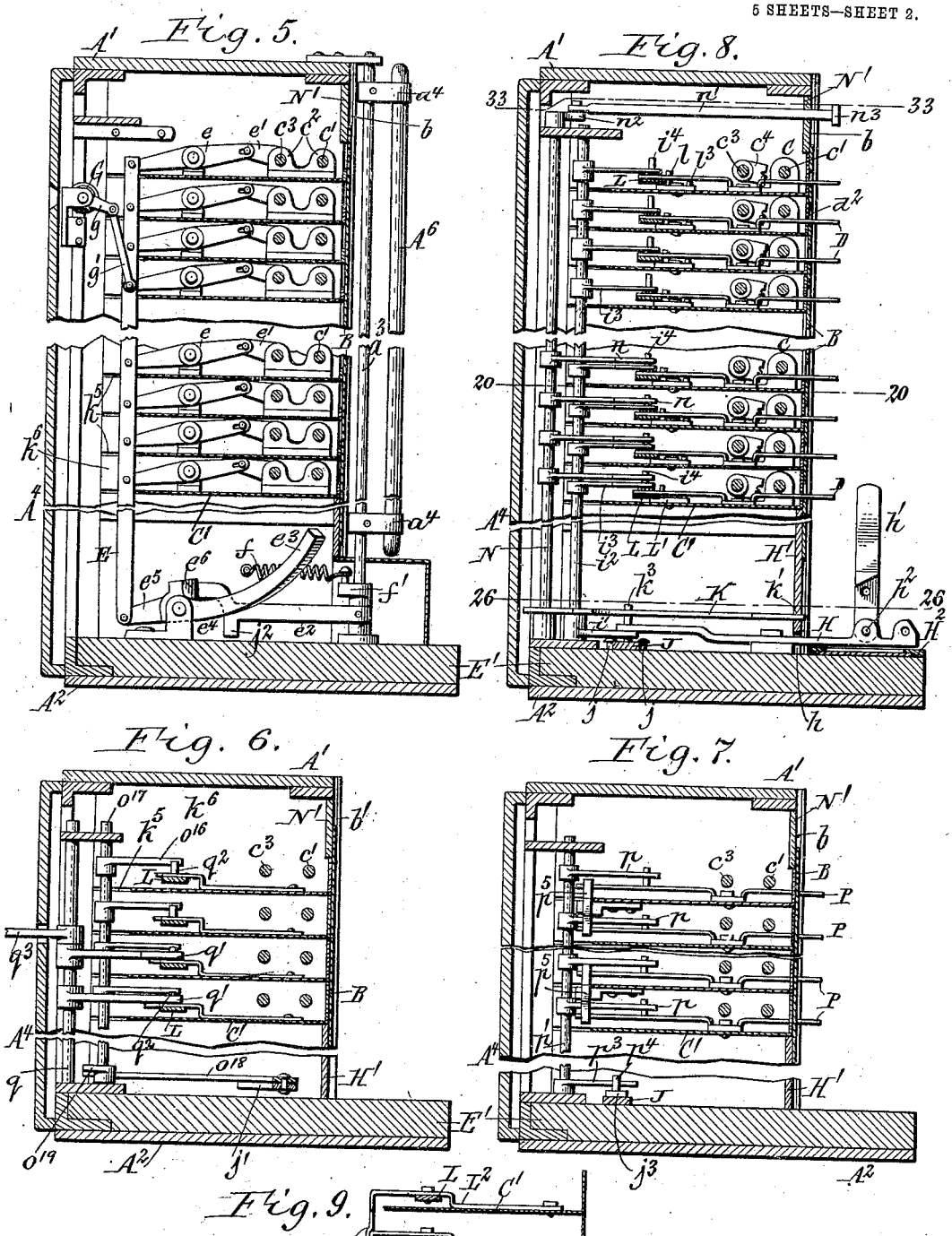

No. 820,790. PATENTED MAY 15, 1906.
M. H. JOHNSON.
VOTING MACHINE.
APPLICATION FILED NOV. 18, 1902.
5 SHEETS—SHEET 3.
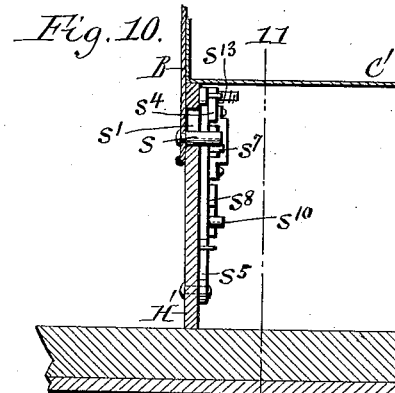
Fig. 10.
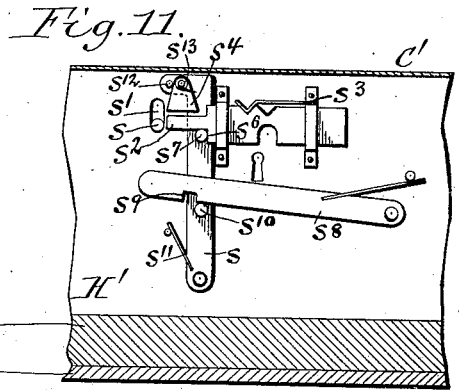
Fig. 11.
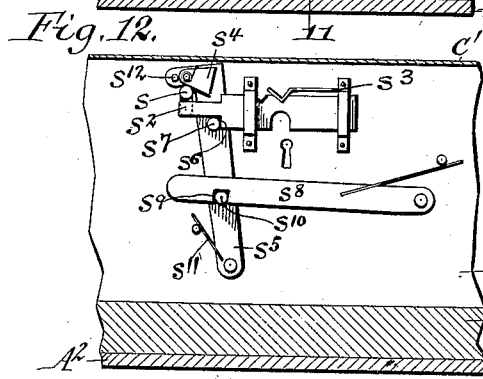
Fig. 12.
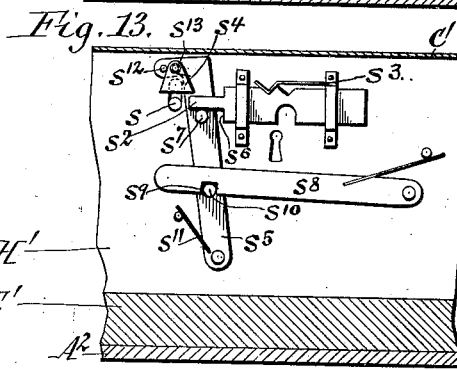
Fig. 13.
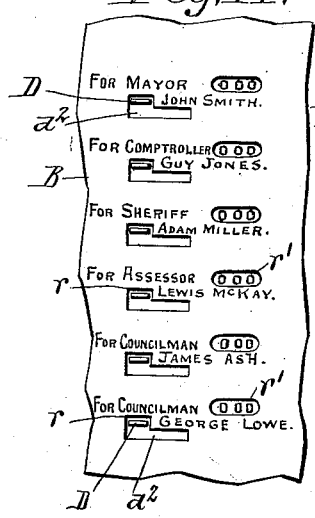
Fig. 14.
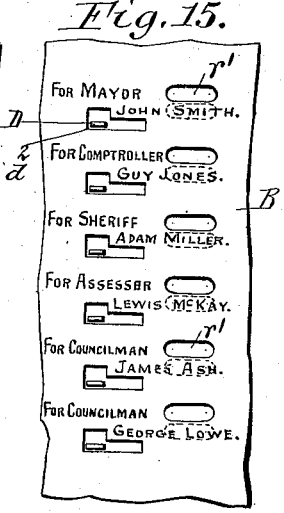
Fig. 15.
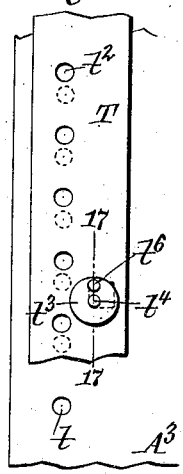
Fig. 16.
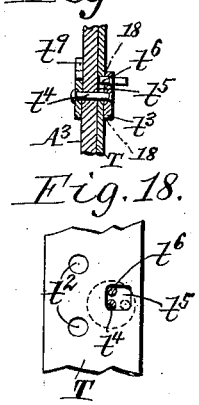
Fig. 17.
Fig. 18.
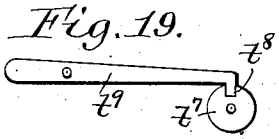
Fig. 19.
Witnesses:
Robert Weitknecht
Emma M. Graham
M. H. Johnson, Inventor
By Geyer & Popp
Attorneys.

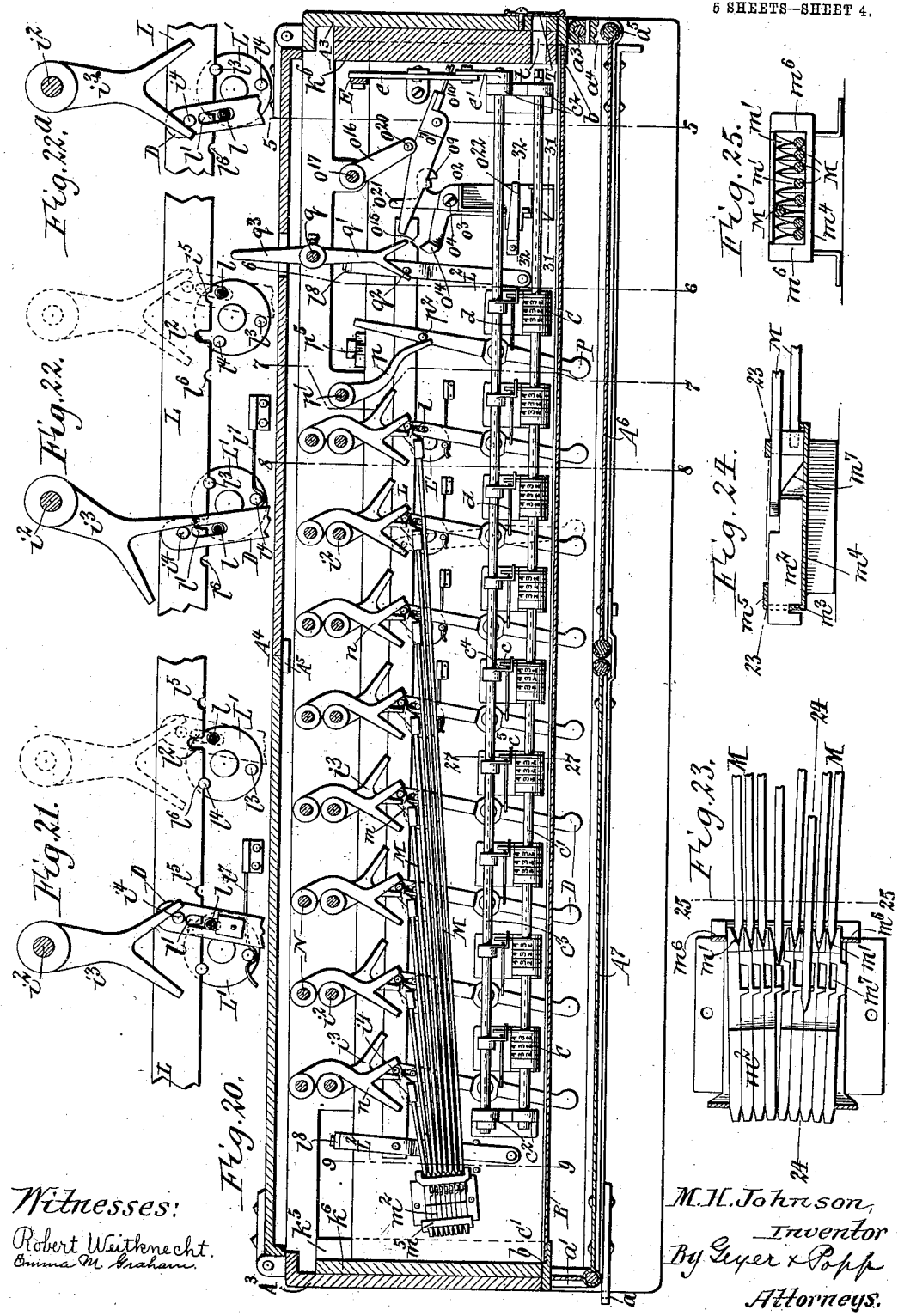

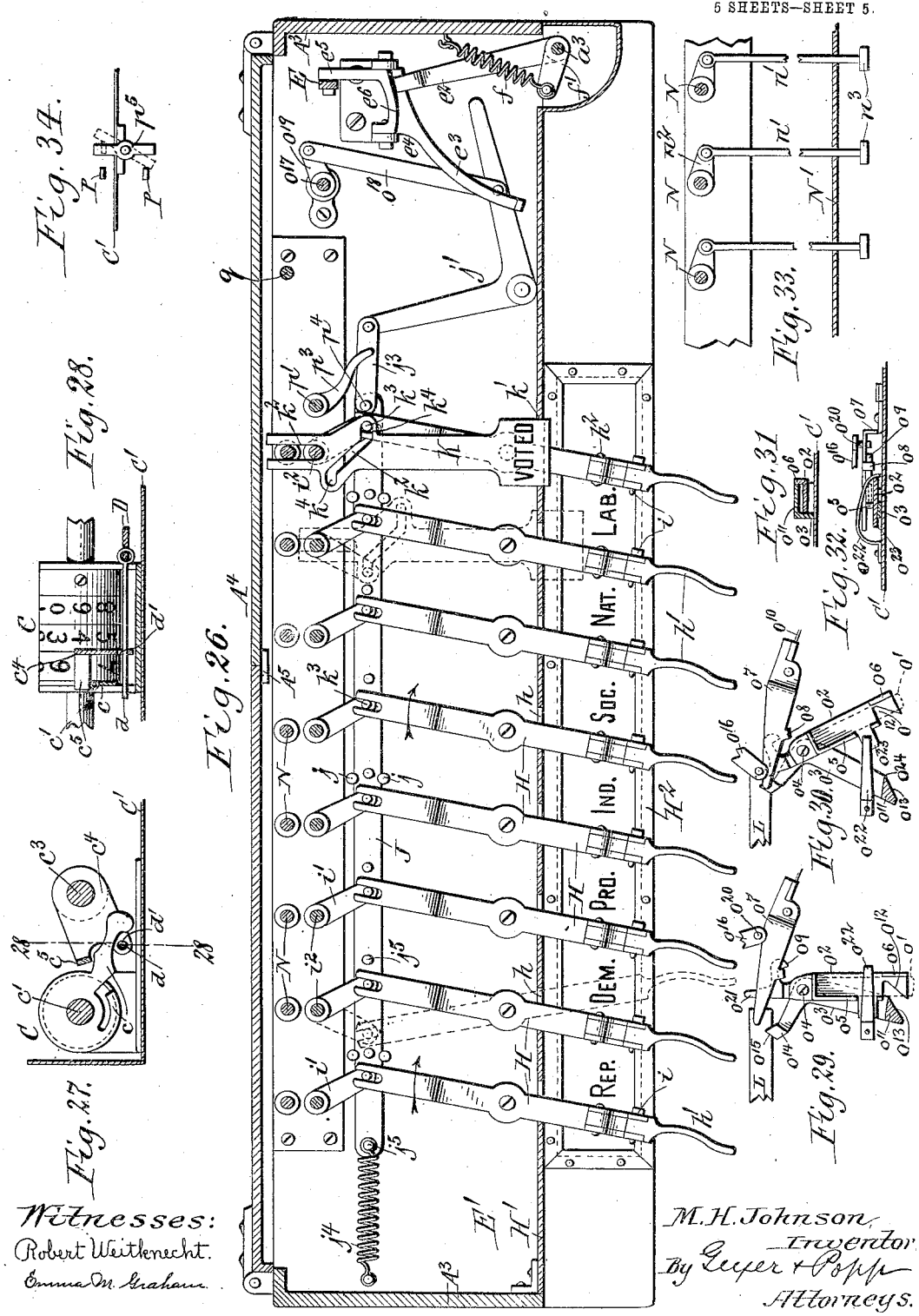

UNITED STATES PATENT OFFICE.

MARQUIS H. JOHNSON, OF BUFFALO, NEW YORK, ASSIGNOR TO JOSEPH F. ROSSELLI, OF BUFFALO, NEW YORK.

VOTING-MACHINE.

No. 820,790.     Specification of Letters Patent.     Patented May 15, 1906.

Application filed November 18, 1902. Serial No. 131,818.

*To all whom it may concern:*

Be it known that I, MARQUIS H. JOHNSON, a citizen of the United States, residing at Buffalo, in the county of Erie and State of New York, have invented new and useful Improvements in Voting-Machines, of which the following is a specification.

This invention has more particular reference to voting-machines of that general class in which the various voting keys or levers are arranged upon an upright face-plate or ballot-support in as many rows or columns as there are political parties represented on the ballot and in which an individual counter or register is combined with each voting-key.

A leading object of my invention is to simplify the construction of such machines and reduce their cost of manufacture.

A further object is the production of an efficient, reliable, and durable machine which meets not only the ordinary requirements of straight party voting, split or mixed ticket voting, and limited voting by women, but which also provides for group voting for such candidates as councilmen, school commissioners, and national or Presidential electors, while at the same time permitting partial or total splitting of this section of a party-ticket.

Additional objects of the invention are to so organize the machine that a voter can readily correct mistakes and to provide effectual safeguards against various fraudulent practices commonly resorted to, such as repeating and tampering with the counters or registers.

In the accompanying drawings, consisting of five sheets, Figure 1 is a front view of the machine with the doors open and a portion of the face-plate broken away. Fig. 2 is a side elevation of the machine. Figs. 3 and 4 are enlarged horizontal sections of the door-hinges in lines 3 3 and 4 4, Fig. 1. Figs. 5, 6, 7, 8, and 9 are transverse vertical sections of the machine in the correspondingly-numbered lines in Fig. 20. Fig. 10 is a transverse section in line 10 10, Fig. 1, on an enlarged scale. Figs. 11, 12, and 13 are longitudinal sections in line 11 11, Fig. 10, showing different positions of the face-plate lock. Figs. 14 and 15 are fragmentary front views of the face-plate, showing the two positions thereof for locking and unlocking the individual-voting keys. Fig. 16 is a fragmentary face view of the shutter which covers the openings opposite the resetting-shafts of the registers. Fig. 17 is a vertical section in line 17 17, Fig. 16. Fig. 18 is a vertical section in line 18 18, Fig. 17. Fig. 19 is a detached side elevation of the interior locking devices coöperating with said shutter. Fig. 20 is a horizontal section of the machine in line 20 20, Fig. 8. Figs. 21, 22, and 22$^a$ are fragmentary horizontal sections, on an enlarged scale, showing different positions of the locking devices for preventing the elector from voting for more than one candidate of a given line. Fig. 23 is a top plan view, partly in section, of the baffle-bars in line 23 23, Fig. 24. Fig. 24 is a vertical longitudinal section in line 24 24, Fig. 23. Fig. 25 is a transverse section in line 25 25, Fig. 23. Fig. 26 is a horizontal section of the machine in line 26 26, Fig. 8. Fig. 27 is an enlarged cross-section of one of the individual registers and its actuator in line 27 27, Fig. 20. Fig. 28 is a longitudinal section in line 28 28, Fig. 27. Figs. 29 and 30 are top plan views, partly in section, of the free-ballot-voting devices, showing different positions of the same. Figs. 31 and 32 are vertical cross-sections of the same in lines 31 31 and 32 32, Fig. 30. Fig. 33 is a horizontal section in line 33 33, Fig. 8, showing the devices for permitting group splitting. Fig. 34 is a fragmentary rear elevation of a pair of question-voting keys.

Similar letters of reference indicate corresponding parts throughout the several views.

*The frame of the machine.*—The machine is supported on standards A. Its casing is preferably constructed of sheet metal and consists of horizontal top and bottom plates A' A$^2$, side walls A$^3$, a pair of hinged doors A$^4$, forming the back of the casing and provided with a suitable lock A$^5$ and a pair of hinged doors A$^6$ A$^7$, forming the front of the casing when the machine is closed and locked. One of the front doors—say the left-hand one—is adapted when open to stand rigidly at right angles to the front of the machine, as shown in Figs. 1 and 2, so as to serve as a barrier which prevents the voter from passing out at that end of the machine after casting his vote. For this purpose this door is provided at its hinged edge near its middle and its upper and lower ends with perforated lugs $a$, extending beyond said edge and adapted to be secured temporarily to the adjacent hinge-bracket $a'$ by bolts $a^2$, passing through the lugs, as seen in Fig. 3. After the election these bolts are removed to permit the door to be closed. The other front door $A^6$ when open is adapted to stand normally in line with the casing, as shown, and to extend like a turnstile across the exit-passage, through which the voter leaves the machine, so that he cannot pass out without swinging said door backward from the position shown by full lines in Figs. 1 and 4 to that shown by dotted lines in the last-named figure. This movement of the last-named door is utilized for actuating the counters or registers of the machine, as hereinafter explained. To give this door the necessary range of movement, its pintle $a^3$ is journaled at its end in bearings on the casing and pivoted to the outer ends of horizontal arms $a^4$, fastened to the pintle, as shown at $a^5$. In opening and closing the door in the ordinary manner it swings on the double joint formed by the pintle and the pivot by which it is connected therewith. When, however, the door is used as an actuator for the registers, it is temporarily fastened to the arms $a^4$ by bolts $a^6$ and its pintle is then compelled to partake in the swinging movements of the door.

*The ballot-support.*—B indicates an upright face-plate or support, arranged in the casing immediately behind the front doors $A^6$ $A^7$ and forming the front wall of the inclosure which contains the operating mechanism of the machine. This plate bears the names of all the regular candidates nominated by the several political parties, the names of the candidates of each party being arranged in the same vertical row or column and the names of all candidates of the various parties for the same office being arranged in the same horizontal line. The vertical columns are headed by the corresponding party emblems or designations and opposite each horizontal name-space is a space containing the title of the office for which the candidate is running, as shown in Fig. 1. The names may be printed on cards or slips pasted to the face of the supporting-plate. In addition to the names of the regular party candidates, the face-plate bears at its right-hand end statements of any constitutional amendments or other questions to be voted for or against by the electors in a manner common to this type of voting-machines.

*The registers and individual-voting devices.*—Behind the face-plate B and preferably opposite each name of a regular party nominee is located an individual counter or register C of any ordinary or suitable construction having the customary units, tens, and hundreds rings or wheels, and a vibrating actuating-pawl $c$ coöperating with the units-wheel. As the construction of the registers forms no part of my present invention, and as any well-known registers may be employed, the same are not shown in detail.

All of the registers C representing the candidates of the same horizontal lines or office are mounted on a common resetting-shaft $c'$, arranged horizontally in rear of the face-plate B and turning at its ends in bearings $c^2$, supported on a tray or shelf $C'$, there being as many rows of registers, resetting-shafts and trays as there are horizontal lines of offices or candidates. In rear of each row of registers is a universal actuator for the same, comprising a horizontal rock-shaft $c^3$, supported in the bearings $c^2$ and carrying as many rock-arms $c^4$ as there are registers in the row. Each of these rock-arms is adapted to vibrate the pawl $c$ of the companion register once for each actuation of the rock-shaft $c^3$ for registering a single vote at a time. These rock-arms are normally clear of or uncoupled from the register-pawls, so that under normal conditions the movement of the rock-shaft $c^3$ will not affect the registers. Each of said rock-arms may be coupled to or engaged with the pawl of its companion register by a movable coupling-pin $d$, Figs. 20, 27, and 28, which passes through a guide-opening $d'$ in the rock-arm and is adapted to be shifted underneath the pawl, as shown in Fig. 28, so that when the rock-arm is elevated the coupling-pin is raised therewith and caused to vibrate the pawl in the proper direction to turn the units-wheel of the register the distance of one unit. Each of these coupling-pins is operated by an individual-voting key or lever D, the front end of which projects through a slot $d^2$ in the face-plate B to permit its convenient manipulation by the voter. These voting-keys are arranged in horizontal lines corresponding to the rows of registers, and each key is located next to the corresponding name on the face-plate, as illustrated in Figs. 14 and 15. The keys are fulcrumed to the upper side of the trays $C'$, and the coupling-pins $d$ are attached to the front arms of the keys, as shown, so that when the keys are turned toward the right by the voter the coupling-pins are shifted under the register-pawls $c$, while when the keys are returned to their initial position by the restoring mechanism hereinafter described the coupling-pins are retracted clear of the pawls. There are as many vertical rows of individual keys as there are parties represented on the face-plate. Eight rows are shown in the drawings; but the machine may be provided with a greater or less number according to the requirements of the locality in which the machine is used.

E is the universal bar or actuator from which the several rock-shafts $c^3$ are simultaneously operated through the medium of levers $e$, pivoted at their rear ends to said bar and at their front ends to actuating-arms $e'$, secured to the adjacent ends of the rock-shafts, as shown in Figs. 5 and 20. The levers $e$ are fulcrumed to swing vertically on the trays C'. The universal bar is arranged vertically behind the trays and is automatically moved upward for actuating the registers by a rock-arm $e^2$, secured to the door-pintle $a^3$ and arranged to ride over the cam-shaped front arm $e^3$ of a rock-lever $e^4$, having its rear arm $e^5$ connected with the lower end of the universal bar, as shown in Fig. 5. The rock-lever $e^4$ is fulcrumed upon the base-plate E', preferably of wood, and its cam-arm $e^3$ is curved concentric with the door-pintle, as shown in Fig. 26. A spring $f$, which connects an arm $f'$ of said door-pintle with the casing, serves to return the door to its initial position, allowing the universal actuating-bar E to descend and lowering the rock-arms of the register-actuating shafts $c^3$ preparatory to the next stroke of the register-pawls. In order to positively effect the return stroke of these pawls, the rock-arms $c^4$ are provided with lugs $c^5$, adapted to strike the upper sides of the pawls, as shown in Figs. 27 and 28. The rock-lever $e^4$ is provided above its pivot with a cam $e^6$, against which the rock-arm $e^2$ engages during the last portion of its return stroke, thereby returning this lever to its former position.

G, Fig. 5, indicates a counter of any ordinary construction for registering the total number of votes cast at an election. The actuating-pawl $g$ of this counter is vibrated from the reciprocating universal bar E by a link $g'$. This register is visible through an opposing aperture in the back of the casing.

*The straight ticket or party voting devices.*—H indicates a series of party-voting keys or levers by which the elector may vote a straight ticket. Such a party-key is provided for each party-column on the face-plate B and the several keys are arranged in a horizontal row at the base of the columns and in line with the respective columns. These keys are fulcrumed between their ends upon the base-plate E' and their front arms protrude through slots $h$, formed in a stationary wall or front plate H', arranged below the face-plate B. The handles or extensions $h'$ of the keys are preferably hinged to swing upwardly, as shown at $h^2$, so that they may be turned up out of the way to render the machine more compact for storage and transportation. The hinged handles are held down in position by pins $i$, passing through openings in the handles and through perforated lugs on the keys, as shown in Fig. 26. The bifurcated rear arms of the party-keys engage with crank-arms $i'$, secured to a longitudinal series of upright rock-shafts $i^2$, arranged in rear of the trays C' and journaled at their ends in suitable bearings in the stationary casing. As many of these rock-shafts are provided as there are party-keys, and each of said shafts carries a series of forked actuating-arms $i^3$, adapted to engage with upright pins $i^4$ at the inner ends of the opposing row of individual-voting keys D. Upon rocking one of said upright shafts by means of the companion party-key the forked arms thereof swing the corresponding row of individual-voting keys D in the proper direction to couple the pawls $c$ of the companion row of registers C to their actuating-arms $c^4$, thereby simultaneously actuating all of said registers when the voter swings the turnstile-door $A^6$ in leaving the machine, as hereinbefore described. Adjacent to each party-key is located a suitable character or designation, indicating the parties represented by the key, these designations being preferably printed on a card inserted in a horizontal holder $H^2$ underneath said keys.

*The key-restoring devices.*—J indicates a sliding restoring-bar for the individual keys and the party-keys H, arranged lengthwise on the bottom plate of the casing and guided between pins $j$, projecting from said plate, or by other suitable means. This restoring-bar is reciprocated in one direction by a horizontal bell-crank lever $j'$, the free arm of which is tripped by a lug $j^2$ on the rock-arm $e^2$ of the door-pintle during the last portion of the stroke of said rock-arm, so that the restoring-bar is actuated immediately after the actuation of the registers C. This bell-crank lever is fulcrumed on the bottom plate of the casing and connected with the restoring-bar by a link $j^3$. A spring $j^4$, which connects the opposite end of the restoring-bar with the casing, effects the return stroke of the bar. The latter is provided adjacent to the left-hand side of each party-key with an upwardly-extending restoring-pin $j^5$, arranged to strike the inner arm of the lever, so that when the restoring-bar is shifted toward the right by the return movement of the exit-door $A^6$, the inner arms of all the party-keys are swung in the direction of the arrows in Fig. 26. As these keys are connected with the rock-arms at the lower end of the universal rock-shafts $i^2$, the latter and their forks are rocked toward the right, causing all individual keys which have been shifted by the voter to be restored to their initial position ready for the next voter. When the deflected exit-door returns to its normal position, the lug $j^2$ of the rock-arm recedes from the bell-crank lever $j'$, allowing the spring $j^4$, which has been strained by the forward movement of the restoring-bar, to return the latter to its former position.

In the normal position of the individual and party keys the shifting-forks $i^3$ of the individual keys are preferably arranged to the right of their shafts, so that their left-hand jaws stand immediately in front of the pins at the inner ends of said keys, as shown in Fig. 20. When a party-key is shifted by the voter, the shifting-forks of all the corresponding individual keys move idly toward the left until their right-hand jaws strike the pins $i^4$ of the individual keys, as shown in Fig. 21, when they by their continued movement shift the latter to the position shown in Fig. 22, thereby coupling said keys to their registers. If the voter should desire to split one or more offices, he returns the corresponding individual keys to their former position and shifts the individual keys of the chosen candidates in another party toward the right. The jaws of the shifting-forks $i^3$ are separated a sufficient distance to permit this movement of the individual keys in splitting without interference from the forks of previously-shifted individual keys. When the restoring-bar J is shifted forward or toward the right by the exit of the voter, the shifted forks $i^3$ are rocked from their extreme left-hand position to that shown in Fig. 20, restoring the individual keys to their initial position.

Owing to the distance between the jaws of the shifting-forks $i^3$, the first portion of the active stroke of a party-key is idle, and it is therefore desirable to provide means for indicating to the voter whether or not he has fully shifted such a key. For this purpose a visual indicator, consisting, preferably, of a horizontal slide K, is arranged immediately above each of said keys, as shown in Figs. 8 and 26. This slide is guided at its front end in a horizontal slot $k'$, formed in the front plate H', while its rear end is slotted or bifurcated, as shown at $k^2$, and guided on the adjacent upright shafts $i^2$. The slide is provided between its ends with an oblique slot $k^2$, which receives the pin $k^3$ of the underlying rock-arm $i'$ and which has transverse terminal portions $k^4$, which engage with said pin at opposite extremities of the movement of the slide. Upon its widened front portion the slide bears a suitable character or word, such as "Voted," this word being so placed that it is concealed behind the front plate H' when the slide is retracted and completely exposed on the front side of said plate when the slide is fully projected. When a party-key is fully shifted toward the right, the corresponding indicating-slide K is fully projected by the wedging action of the pin $k^3$ against the front wall of the oblique slot $k^2$, thereby fully exposing the word "Voted" and indicating to the voter that he has properly shifted the key. Should said word be but partly exposed, he knows that he has not given the key its full stroke and that he must complete its movement in order to register his vote. When the restoring-bar J is operated, the projected slide is retracted to its former position by the wedging action of the pin $k^3$ against the rear wall of the oblique slot of the slide. The transverse end portions of the oblique slot $k^2$ in each slide form stops which prevent accidental displacement of the slide in either of its extreme positions.

*The removable sections.*—In order to facilitate the assemblage and removal of different sections of the machine without disturbing adjacent sections, each horizontal row of individual registers C and the complementary voting-keys D, actuating-shaft $c^3$, and main rock-lever $e$ are all mounted on the same tray C', which latter is removable from the case independently of the other trays. Each tray, with the parts carried by the same, thus constitutes a separate and distinct section. These trays preferably slide at their ends in horizontal grooves or ways $k^5$, formed in boards $k^6$, which line the side walls of the casing. For the same purpose the face-plate B is removably arranged in vertical ways $b$, secured to the front edges of said lining-boards, so that this plate may be withdrawn upwardly from its ways. To remove one of the register-sections of the machine, it is only necessary to open the rear door of the casing, disconnect the corresponding rock-lever $e$ from the universal bar E, and remove the face-plate B, when the section can be withdrawn forwardly out of its ways.

*The locking devices for preventing voting for more than one candidate for the same office.*— To prevent a voter from voting for more than one candidate for the same office, a suitable locking device is combined with each horizontal line of individual-voting keys D. Each of these locking devices preferably comprises a horizontal locking-bar L and a series of tumbler-disks L', actuated by the individual keys and coöperating with said locking-bar, such a locking-bar being arranged lengthwise above each tray C' and underneath the inner arms of the corresponding row of individual keys. Each of these locking-bars is carried and guided by horizontal arms $L^2$, pivoted to the tray C'. The locking-disks L' are journaled on the upper side of the tray, and each disk is provided with an upwardly-projecting pin $l$, playing in a longitudinal slot $l'$ in the companion key and adapted to engage with a deep notch $l^2$, formed in the opposing front edge of the locking-bar L. The pin $l$ is located on the rear side of the axis of the disk, so that when the corresponding individual key is shifted toward the right in voting the rear side of the disk is turned toward the left from the position shown in Fig. 21 to that shown in Fig. 22 by reason of the pin-and-slot connection $l$ $l'$. Each locking-notch $l^2$ is located opposite its companion pin $l$ of the disk in the normal position of the locking-bar L, and when the disk is turned by the individual key, as above described, said pin enters said notch during the first portion of the rotary movement of the disk and by its continued movement with the disk shifts the locking-bar toward the left to the position shown in Fig. 22, the bar receiving a rectilinear movement from the rotary disk in the same manner that a rack-bar is shifted by a gear-pinion. This shifting of the locking-bar breaks the coincidence between all its remaining notches $l^2$ and the coöperating locking-pins of the unactuated disks of the same horizontal series, as shown with reference to one of the unactuated disks in Fig. 22, thereby blocking the rotation of such other disks and locking the companion individual keys against movement. When the actuated key of a line is restored to its initial position, the companion locking-disk is turned back to its forward position, causing its locking-pin to reënter the deep notch of the locking-bar and returning the latter to its original position.

In order to prevent rebound or overthrow of the locking-bars in either direction, each tumbler-disk L' is provided with two stop-pins $l^3$ $l^4$, arranged equidistant from the locking-pin $l$. These stop-pins are adapted to interlock alternately with shallow notches $l^5$ $l^6$, formed in the front edge of the locking-bar on opposite sides of the deep notch $l^2$ and at the proper points to receive the stop-pins. By this construction when a tumbler-disk is oscillated toward the left its right-hand stop-pin $l^3$ interlocks with the corresponding notch $l^5$ of the locking-bar just as the latter reaches the end of its forward stroke, while when the disk is oscillated in the opposite direction its left-hand stop-pin $l^4$ interlocks with the corresponding notch $l^6$ of the locking-bar just as the latter reaches the end of its return stroke. To prevent recoil of the tumbler-disks, a suitable detent-spring $l^7$ is arranged to interlock alternately with the stop-pins $l^3$ $l^4$ of each disk, as shown in Figs. 20, 21, 22.

*The device for preventing the operation of more than one individual key of a series at a time.*—To frustrate attempts to simultaneously shift two or more individual keys representing different candidates for the same office, the following limiting mechanism is employed:

To the inner end of each individual key a stop-rod M is pivotally connected, preferably by an arm $m$, pivoted upon the shifting pin of the key, as shown in Fig. 20. All the stop-rods of the same horizontal series of keys extend laterally in groups, preferably toward the left-hand side of the casing, and terminate normally at a common transverse line. Their free ends are tapered and enter flaring throats or spaces $m'$, formed by the opposing beveled sides of a series of baffle-bars $m^2$, arranged horizontally side by side and substantially parallel with the stop-rods, as shown in Fig. 20. These baffle-bars are swiveled at their rear ends upon an upturned lip $m^3$, formed transversely at the rear end of a raised base-plate $m^4$ and entering notches formed in the under sides of the bars, the latter being held down in engagement with the lip by a retaining-flange $m^5$, extending across the upper sides of the bars and preferably formed integral with the base-plate $m^4$. The series of baffle-bars is loosely arranged between a pair of parallel walls or flanges $m^6$ on the base-plate $m^4$, which walls limit the lateral or spreading movement of the free front portions of the bars. The series contains one more bar than there are locking-rods, and the tapering front end of each of said rods enters between a pair of adjacent bars. The lateral play of the bars is so limited that no one of the same can become separated from its neighbor a distance greater than the thickness of a single stop-rod. The result is that but a single stop-rod can enter between the parallel sides of two baffle-bars at a time, the remaining bars being crowded closely against one another and blocking the advancement of all the remaining rods of the series beyond their normal position, as shown in Figs. 23 and 25. Should it be attempted to operate two or more individual keys at a time, the corresponding stop-rods will be thrust forward simultaneously, and while each will spread the companion baffle-bars to a certain extent all of the shifted rods will be blocked before the keys have been moved a sufficient distance to couple the corresponding registers to their actuators. As shown in Fig. 23, the rear portions of the baffle-bars are tapered to permit the requisite swiveling movement of the bars.

*The multicandidate or group voting mechanism.*—In the machine shown in the drawings the lower horizontal rows of individual-voting keys are designed for offices for which a plurality of candidates are nominated by each party, such as councilmen, school commissioners, or Presidential electors. Four rows of such voting-keys are set aside for this purpose in the machine illustrated in the drawings; but a greater or less number may be employed according to the requirements of the particular locality or election. In order to limit the voter to the selection of the prescribed number of such candidates, means must be provided for locking or rendering inoperative the registering mechanism representing the remaining candidates of the group. For this purpose the several locking-bars L, controlling the four horizontal rows of multicandidate-keys are positively connected together, preferably by vertical arms or extensions $l^8$, depending from the rear ends of the guide-arms $L^2$. Each of these extensions is removably secured to the extension next below it by a screw $l^9$ or other suitable fastening, so that a greater or less number of the locking-bars may be readily coupled together in accordance with the number of candidates to be included in the group. The individual keys representing the multicandidate group of each party have complementary registers and register-actuating devices precisely like those of the individual keys representing the other offices and are connected with the respective party-keys through the upright universal shafts $i^2$, so that when a party-key is actuated the corresponding group candidates as well as the other candidates of the same party are simultaneously voted for. If, for example, four councilmen are to be elected, and it should be desired to vote the straight Republican ticket, excepting two of the candidates for councilmen, the voter first operates the corresponding party-key H. He then restores the individual-voting keys of the two Republican candidates for councilmen on which he wishes to split and finally operates the individual keys representing the two councilmen for which he wishes to cast his vote. All of the locking-bars of the group-voting keys are necessarily shifted back toward the right when the keys of the unvoted candidates are thus returned to their initial position; but it will be observed that all of the group-keys excepting the two finally voted nevertheless remain locked, because there is no direct communication between the locking-bars and the tumbler-disks L', and hence all the tumbler-disks except those belonging to said two finally-voted keys have remained undisturbed, and although the locking-bars have been shifted they have been moved to a position in which their deep locking-notches $l^2$ break register with the corresponding pins of the tumbler-disks. When the two desired keys above mentioned are finally operated, the several locking-bars are again shifted in the opposite direction, breaking the register between the deep locking-notches of the bars and the corresponding pins of all the tumbler-disks except those belonging to the actuated keys.

To enable an elector to split on all the group candidates of the same party at a time instead of individually, the individual keys representing the group of each party are controlled by a suitable group-key accessible from the front of the machine. The preferred mechanism for this purpose consists of a series of vertical shafts N, one for each party represented on the ballot, each of which shafts carries a vertical row of shifting-forks $n$, which engage with the pins at the inner ends of the group-keys representing the multicandidates of the same party. These shafts are rocked by horizontal push-rods $n'$, which are connected at their inner ends to rock-arms $n^2$ of the respective shafts and extend forwardly through openings in a stationary plate N', arranged above the face-plate B. These rods terminate in suitable knobs or buttons $n^3$, as shown in Figs. 1, 8, and 33. Upon pushing any one of these buttons all of the keys representing the multicandidates of the corresponding party are simultaneously shifted. With each horizontal line of keys representing such group candidates is combined a locking mechanism similar to the stop-rods M and the baffle-bars $m^2$, hereinbefore described, so that but one key of such a line can be operated at a time. Inasmuch as an elector may wish to split on two or more group candidates of the same party, it is necessary to so organize said blocking mechanism that he may successively operate two or more of the group-keys in the same horizontal line. To this end each of the baffle-bars coöperating with the stop-rods of such a line of keys is provided at a suitable distance in rear of its front end with a laterally-extending incline $m^7$, adapted to bridge the space formed by the separation of two adjacent bars when a stop-rod is thrust forward between the same, as shown in Fig. 23. A stop-rod when thus shifted first wedges between the two opposing baffle-bars, as hereinbefore described. The bar after having advanced far enough to cause the blocking of the remaining stop-rods and before reaching the end of its stroke rides upon the incline $m^7$, which intercepts its path, automatically lifting the front end of the rod clear of the baffle-bars and permitting the stop-rod of another key of the same horizontal line to enter between a pair of the baffle-bars. The inclines $m^7$ are so arranged relatively to the stroke of the locking-bars L that each of the latter is fully shifted into its locking position for locking all the unactuated multicandidate-keys before the stop-rod of the actuated key is deflected out of engagement with the baffle-bars by the companion incline. In order to permit the baffle-bars to bear closely against each other, each bar, excepting the end ones of the series, is provided opposite the incline of the contiguous bar with a recess for receiving the beveled lug which carries the incline, as shown in Fig. 23. As shown in Fig. 25, the baffle-bars are tapered upwardly to provide the necessary clearance between the same for permitting the bars to come together underneath an advanced and elevated stop-rod, thereby providing the necessary play between the baffle-bars to permit another rod to be advanced between a pair of the bars, while the previously-advanced rod or rods remain in their former position.

*The irregular or free ballot mechanism.*— At a suitable place on the face-plate B is a vertical series of slots $o$, coinciding, respectively, with the horizontal rows of individual candidate-keys and adapted to receive cards or ballots $o'$, upon which are written the names of irregular candidates or such as do not appear on any of the regular party tickets. In the machine shown in the drawings the irregular-ticket column is located at the right of the "question" voting-column.

Immediately behind each of the card-slots and in line therewith is a card-holder comprising two movable jaws or members $o^2$ $o^3$, which are preferably mounted to swing horizontally on the same pivot $o^4$, as shown in Figs. 20, 29, and 30. The free front ends of these jaws face the card-slot, and the upper jaw $o^2$ is constructed in the form of an oblong pocket open at its front end and of the proper length and width to receive a ballot-card or slip. In the construction shown the pocket is also open on its upper side, and its left-hand side wall $o^5$ terminates short of the front end of the pocket, while the opposite side wall $o^6$ extends but a short distance rearwardly from the front end of the pocket, leaving that side of the pocket open for the lateral discharge of the card. The pocket-jaw is normally held at right angles to the face-plate B by a horizontally-swinging detent $o^7$, pivoted to the adjacent tray $C'$ and provided with a lug $o^8$, which interlocks with a laterally-extending hook or catch $o^9$, arranged on said jaw on the rear side of its pivot, as shown in Figs. 20 and 29. A spring $o^{10}$, extending rearwardly from this detent and bearing against a stationary pin, serves to hold the detent in engagement with said hook. The other or lower jaw $o^3$ of the card-holder is provided at its front end with a raised lug $o^{11}$, arranged opposite the short right-hand wall of the upper jaw and adapted to enter a notch $o^{12}$ in the latter. This lug has a beveled inner face $o^{13}$, which forms with said short wall an inwardly-tapering throat through which the card must be passed in inserting it in the pocket of the upper jaw. The inner end of this throat is narrower than the card, so that in inserting the latter the lower jaw is wedged into the open position. (Shown in Fig. 29.) The last-named jaw is provided at its inner end with a laterally-extending locking-arm $o^{14}$, which interlocks with a notch $o^{15}$ in the front edge of the locking-bar L of the corresponding horizontal series of individual keys when said jaw is opened, as shown in Fig. 29, thereby preventing the actuation of any of the keys of that series except by mutilating the inserted card, as hereinafter described.

On the rear side of each detent $o^7$ a horizontal restoring-arm $o^{16}$ is arranged, and the several restoring-arms of the various card-holding jaws are secured to an upright rock-shaft $o^{17}$, located in the rear portion of the casing. This rock-shaft is actuated from the bell-crank lever $j'$ by a link $o^{18}$, which connects said lever with an arm $o^{19}$ of the rock-shaft, as shown in Fig. 26, so that when the restoring-bar J is shifted forward the restoring-arms $o^{16}$ are at the same time rocked toward the left. Each of these restoring-arms carries a vertical trip-pin $o^{20}$, which rides over the rear side of the adjacent detent $o^7$ during the first portion of the advancing movement of the arm, swinging the detent forwardly sufficiently to disengage its locking-lug $o^8$ from the hook $o^9$ of the upper jaw of the card-holder and releasing said jaw. This jaw is provided at its rear end beyond said hook with an arm or projection $o^{21}$, which extends into the path of the pin $o^{20}$, carried by the restoring-arm, and which is engaged by said pin after the latter has released the detent, thereby swinging the upper jaw toward the right, as shown in Fig. 30.

$o^{22}$ indicates a card-ejector, preferably consisting of a flat spring secured to the tray $C'$ and extending over the upper jaw of the card-holder in the normal position thereof, the free end of the spring being bent to overlap the right-hand edge of the upper jaw, as shown in Fig. 32. When the card is inserted in the holder, it passes under this spring, and when the upper jaw is opened to the position shown in Fig. 30 the card is stripped clear of the spring, bringing the free end of the latter on the left or rear side of the card, as shown in said figure. In this position the free end of the spring rests on an ear $o^{23}$, projecting from the adjacent side of the upper jaw. When the restoring-arm $o^{16}$ is rocked toward the right by the return stroke of the turnstile-door $A^6$, its pin rides over the back of the hook $o^9$ of the upper jaw, returning the latter to the normal position (shown in Figs. 20 and 29) and causing the card to be pushed out of the pocket of said jaw by the ejector-spring $o^{22}$. In order to effect the return of the lower jaw of the holder to its closed position, its locking-arm $o^{14}$ is provided with a beveled head, and the coöperating notch of the locking-bar is correspondingly beveled, as shown in Fig. 29. When this locking-bar is shifted toward the right for restoring it to its initial position, the edge of the notch $o^{15}$ rides over the beveled face of the locking-arm and pushes the latter forwardly, closing the lower jaw.

If after inserting a free-ballot card in one of the holders it should be attempted to shift an individual key representing a regular-party candidate for the same office, the corresponding locking-bar L will be shifted toward the left, and its bevel-sided notch $o^{15}$ by riding over the locking-arm of the lower jaw of the card-holder will swing this jaw into its closed position. This causes the inserted card to be nicked or mutilated by the sharp edge $o^{24}$ of the lug $o^{11}$. When such a discharged card is afterward found by the city clerk, it indicates to him that some voter has cast two votes for the same office, and for this reason such mutilated cards are not counted in canvassing the vote.

When any individual-voting key of a horizontal line is shifted, the beveled notch $o^{15}$ of the corresponding locking-bar L is moved out of register with the beveled head of the locking-arm of the lower jaw $o^3$, thereby blocking the opening movement of said jaw and rendering it impossible to insert a card in the holder.

*Means for voting on amendments and questions.*—This mechanism comprises one or more pairs of voting keys or levers P, preferably arranged in a vertical series between the row of free-ballot slots and the extreme right-hand row of candidate-keys. With each of these amendment or question keys is combined a register C and a coupling-rod D like the corresponding devices coöperating with the candidate-keys, as shown in Fig. 20, so that upon shifting the affirmative or the negative key of a pair a corresponding vote will be registered. These keys are restored to their vertical position by a series of rock-arms $p$, mounted on a vertical rock-shaft $p'$ and engaging against pins $p^2$ on said keys, respectively. This restoring-shaft is provided near its lower end with an actuating-arm $p^3$, arranged to be engaged by a pin $p^4$ on the main restoring-bar J, as shown in Fig. 26.

To prevent simultaneous actuation of both question-keys of the same pair, a vertically-swinging tumbler $p^5$ is employed. This tumbler preferably consists of a lever pivoted between its ends upon a horizontal pin mounted on the adjacent tray C' and having its arms arranged opposite the inner arms of the two question-keys, respectively, the latter being arranged one above the other. By this arrangement upon actuating either of these keys its inner arm strikes the opposing arm of the tumbler-lever, thereby swinging the latter into its reversed position and bringing its other arm against the other key of the pair or in a position to be shifted by the same. After once shifting one of the question or amendment keys of a pair it is therefore impossible to shift the other without returning the previously-shifted key to its former or ineffective position.

*Means for locking or cutting out the candidate-keys representing certain offices.*—In States where women have the right to suffrage they are in most cases permitted to vote only for candidates for certain offices, such as school-commissioners. In order to limit their voting to such candidates, I provide means under the control of the election-inspectors for locking or rendering ineffective the various series of voting-keys representing offices as to which women have no vote. This locking mechanism preferably comprises an upright rock-shaft $q$, arranged in the rear portion of the casing and having a series of shifting-forks $q'$, which engage, respectively, with pins $q^2$ on those locking bars L corresponding to the prohibited offices, so that upon rocking said shaft in the proper direction said locking-bars are shifted lengthwise out of their normal position, thereby breaking the register between their deep locking-notches and the locking-pins of the tumbler-disks and locking the latter and the individual keys connected therewith. The shaft is actuated by an arm $q^3$, extending rearwardly therefrom through an opening in the back of the casing, where the same is accessible to an inspector in charge of the machine. As shown in Fig. 6, the rear pivots which connect the locking-bars with the carrying-arm L are extended upward sufficiently to be engaged by the shifting-forks $q'$. When a woman appears to vote, the inspector simply shifts the actuating-arm $q^3$ for locking the predetermined lines of keys, and if the next voter is a man he unlocks said keys by returning the arm to its normal position. To facilitate the adjustment of this part of the machine, the rock-shaft $q$ for cutting out certain keys may be provided with a shifting-fork for each section or office, the forks being clamped to the shaft by set-screws or similar means, so that the desired forks may be turned and clamped in their operative position and the remaining inactive forks clamped in an inoperative position.

*The means for locking the voting-keys at the close of the polls.*—To prevent fraudulent manipulation of the voting-keys at the close of the election, the face-plate B of the machine is made movable relatively to the voting-keys and constructed to interlock therewith in such manner that when the plate is moved to its normal position the keys are free to be actuated, while when the plate is moved out of that position it locks the keys. In the preferred construction shown in the drawings the face-plate is capable of sliding vertically or at right angles to the direction of movement of the voting-keys, the plate moving in suitable guides or ways in the side walls of the casing, as hereinbefore described. Each of the slots in the plate through which the individual voting-keys project is provided at its initial end with a transverse notch $r$, preferably located in the upper edge of the slot and forming a locking-shoulder which stands on the front side of the key and locks the same when the face-plate is lowered to its abnormal position, as shown in Fig. 14, and which clears and releases the key when the plate is raised to its normal position, as shown in Figs. 1 and 15. These locking-notches are preferably just wide enough to easily receive the keys, so as to lock the latter against movement in both directions.

The movable face-plate is provided with vertical rows of sight-apertures $r'$, arranged opposite the individual register C, respectively, and made of the proper width to expose only one line of figures on the register at a time, as shown in Fig. 14. These apertures are so arranged that they expose the registers when the face-plate is lowered, while moving out of coincidence with the registers for concealing the same when the face-plate is raised.

When the voting-machine is brought to the booth and before the voting begins, the face-plate is in its lowered position, exposing the various registers and enabling the inspectors to see whether or not the same are all turned back to zero. After such inspection the face-plate is raised to cover the registers and release the voting-keys and the plate is locked in place. Any suitable lock may be used for this purpose; but I prefer to employ the locking mechanism shown in the drawings, which is so organized that while permitting the inspectors to again unlock the raised plate and lower the same at the close of the polls it automatically locks the plate in its lowered position at that time in such manner that the same can be unlocked only by the city clerk or other officer intrusted with the canvassing of the vote, who alone has access to the automatic lock for again unlocking the face-plate preparatory to the next use of the machine. This automatic lock is constructed as follows:

Referring to Figs. 10 to 13, $s$ is a rigid locking-pin projecting rearwardly from the lower portion of the sliding face-plate and passing through a vertical slot $s'$, formed in the lower front plate $H'$.

$s^2$ indicates a horizontal locking-bolt sliding in guides on the rear side of said plate and engaging in its projected position under the locking-pin of the face-plate when the latter is raised, as shown in Fig. 12, thereby supporting and locking the plate in this position. This bolt is held against accidental displacement by a suitable detent-spring $s^3$ and is thrown by an ordinary key inserted through a hole in the plate and adapted to engage with a notch of the bolt.

$s^4$ is a supplemental locking member or tumbler adapted to automatically lock the face-plate in its lowered position after the same has been unlocked by the inspectors and lowered at the close of the polls. This tumbler is pivoted in a pendent position to the upper end of a swinging carrying-arm $s^5$, pivoted at its lower end to the front plate, so as to vibrate parallel therewith. This carrying-arm is compelled to move forward with the main locking-bolt by a shoulder $s^6$ on the latter, which engages a projection $s^7$ on the carrying-arm, as shown in Fig. 12. The arm is positively locked in its forward position by a suitable latch, that shown in the drawings consisting of a vertically-swinging bar $s^8$, pivoted to the front plate and having a notch $s^9$, which interlocks with a pin $s^{10}$ of the arm. A spring $s^{11}$ acts to return the carrying-arm to its initial position when unlatched. The tumbler is so arranged that during its forward stroke it encounters the locking-pin $s$ of the elevated face-plate, swinging the tumbler into the approximately horizontal position shown in Fig. 12 and supporting it in that position so long as the face-plate remains elevated. When the main locking-bolt is retracted by means of the inspector's key and the face-plate is lowered, the locking-pin of the plate descending with the latter clears the tumbler and allows it to swing by gravity to its pendent position, in which it overhangs said locking-pin, thereby blocking the upward movement of the pin and locking the face-plate in its depressed position, as shown in Fig. 13. It will be observed that this final locking of the face-plate takes place automatically upon lowering the plate after having unlocked it in its upper position by hand. In order to unlock the lowered plate, it is necessary to lift the latch out of engagement with the pin $s^{10}$ of the tumbler-carrying arm $s^5$, when the spring of this arm will return the same to its initial position for withdrawing the tumbler from the locking-pin of the face-plate. These parts are accessible only from the inside of the machine and through the rear doors, and as the keys for unlocking these doors are in the custody of the city clerk or other supervising election-officer it is impossible for others to tamper with the registers or counters or their actuators after the automatic locking of the face-plate above described.

A stop $s^{12}$ is arranged on the carrying-arm $s^5$ on the front side of the tumbler for limiting its forward swing. In order to prevent the tumbler from being jarred out of its locking position, a spring $s^{13}$ is applied thereto, which is preferably coiled around the pivot of the tumbler, as shown in Figs. 10 to 13.

*The shutter of the register-resetting devices.*— Each of the register-resetting shafts $c'$ is squared at one end, preferably its right-hand end, for turning it to set the registers back to zero ready for the next election. The wrench or key by which these shafts are turned is inserted through openings $t$, formed in the side of the casing opposite the shafts. These openings are normally closed by a shutter T, applied to the outer side of the casing over the openings and guided on the casing by pins $t'$, secured to the latter and passing through vertical slots in the shutter, as shown, or by other suitable means. This shutter is provided with a longitudinal series of sight-apertures $t^2$, properly spaced to coincide with the wrench-openings of the casing when the shutter is slid out of its normal position (preferably in a downward direction) and adapted to move out of coincidence with said openings for covering the same when the shutter is slid upward into its normal position, as shown in Fig. 16. With this shutter is preferably combined a locking device which when the shutter is shifted to its normal position by the inspector operates to automatically lock the shutter in such manner that it can thereafter be unlocked only by the city clerk from the inside of the casing, similar to the automatic lock of the movable face-plate B. This lock, which is shown in Figs. 16, 17, and 18, consists of a rotary locking-button $t^3$, arranged on the outer side of the sliding shutter and rigidly secured to a shaft or spindle $t^4$, which passes through an opening in the adjacent wall of the casing. The spindle also passes through a slot or aperture $t^5$, formed in the shutter. The locking-button is provided with an eccentric locking-pin $t^6$, projecting into said slot and adapted to stand either above the spindle or at one side thereof, the slot being of sufficient size to permit said pin to be shifted from one of these positions to the other. When the button is turned to bring the locking-pin to the right of the spindle, as shown by dotted lines in Fig. 18, the shutter is released and free to be slid up or down for exposing or covering the wrench-openings $t$. When the shutter is in its upper or closed position and said button is turned to bring the locking-pin above the spindle, the pin bears against the upper edge of the slot, as shown in Figs. 16 and 17, thereby locking the shutter against downward movement. The spindle is provided on the inner side of the adjacent wall of the casing with a locking head or disk $t^7$, tightly secured to the spindle and provided with a peripheral notch $t^8$, with which a pawl or latch $t^9$ automatically interlocks as soon as the locking-pin of the button reaches a position directly above the spindle, as shown in Fig. 19. It will thus be seen that after the inspector has reset the registers the shutter is automatically locked from the inside of the casing by the act of turning the button to the position shown in Fig. 16, and hence no person except the city clerk can thereafter open the shutter. The clerk obtains access to the inside lock of the shutter through the rear doors of the casing and can release the same by simply lifting the latch $t^9$ out of engagement with the locking-disk and turning the latter in the proper direction to unlock the shutter.

*The operation of the machine.*—In the normal condition of the machine for voting the turnstile-door $A^6$ stands open and across the exit-passage through which the voter leaves the machine, while the other front door $A^7$ is rigidly secured at right angles to the machine to prevent the voter from passing out at that side. The individual keys D are at the left-hand end of their stroke, in which their coupling-rods $d$ are in their retracted ineffective position, while the face-plate is in its elevated position, concealing the registers, releasing the individual-voting keys, and permitting the latter to be moved the full length of the slots in the face-plate for registering a vote. The locking-bars L of the individual-voting keys are at the right-hand extremity of their stroke, leaving the tumbler-disks L′ unlocked, and consequently permitting the actuation of any of said keys and also the party-keys H. The universal key-restoring bar J is also at the left-hand extremity of its stroke ready to be shifted in the opposite direction by the turnstile-door and the intermediate operating mechanism. At the same time the shutter T is closed to prevent access to the register-resetting shafts $c'$.

Should a voter desire to vote a straight party-ticket, he simply shifts the corresponding party-lever to the right. By this movement the universal rock-shaft $l^2$, representing that party, is actuated, causing its vertical series of shifting-forks $i^3$ to swing the complementary row of individual-voting keys into their right-hand or voting position. This causes the coupling-rods $d$ of the shifted keys to move underneath the actuating-pawls $c$ of the companion registers preparatory to registering the vote. By this movement of the individual keys the corresponding tumbler-disks L′ are oscillated in the proper direction to shift the locking-bars L of all the sections toward the left, thereby locking the voting-keys which represent all of the remaining unvoted party-tickets and also those keys which represent the nominees of the multicandidate group not voted for. In leaving the machine, the voter swings the turnstile-door, which latter rocks the universal actuating-shafts $c^3$ through the medium of the trip-arm $e^2$, cam-lever $e^4$, universal bar E, and rock-levers $e$, thereby registering the vote and also turning the total register the distance of one unit. Immediately after operating the register-operating devices the turnstile-door during the last portion of its forward stroke shifts the universal restoring-bar to its right-hand extremity through the medium of the trip-arm $e^2$ and the bell-crank lever $j'$, restoring all of the voting-keys to their former position ready for the next voter.

Should the voter desire to split on any of his party candidates in the multicandidate group, he first operates his party-key, then restores the individual keys representing the candidates to be excluded, and then shifts the individual keys representing the candidates of the other party or parties for which he wishes to vote.

If desired, the elector may vote a split ticket by simply actuating the corresponding individual keys without shifting a party-key, avoiding the confusion liable to result when the voter is required to first operate a party-key in order to split his ticket.

At the close of the polls the chairman or other election official unlocks the face-plate B and lowers it to the position shown in Figs. 1 and 14, thereby locking all of the individual keys, exposing the individual registers for making out the election-returns, and automatically relocking the face-plate in its depressed position, as hereinbefore described.

Among the meritorious features of my improved machine are its simplicity, compactness, and comparatively inexpensive construction, considering its capacity to meet all the various conditions arising at primaries and regular elections in different States or other political divisions. It also affords the following additional advantages:

The several actions or voting devices are direct, reducing to a minimum their liability to get out of order. Comparatively few springs are employed in the machine. All of the voting-keys are conveniently located and all move in one direction, simplifying their manipulation and avoiding confusion. The close relation between the names on the face-plate of the machine and the voting-keys also prevents confusion. The machine affords an effectual safeguard against the fraudulent practice of giving a favored candidate a number of counts in advance of his rivals and against the practice of voting for a greater number of candidates than is lawful. The organization of the machine is such that if a voter should change his mind after voting a certain party-ticket, he can throw out that entire ticket by a reverse movement of the same party-key which he shifted in first voting. The group or multicandidate voting mechanism can be easily adjusted and adapted to all primaries and elections. The machine enables the voter to partly split the group-section of his ticket or to discard all the group candidates of his party and substitute those of another party without disturbing the remainder of his party-ballot. The compactness of the machine affords this advantage without requiring its size to be increased to an objectionable extent.

My invention may be variously modified without departing from its spirit and scope, and I therefore do not confine the same to the particular construction herein shown and described.

In the following claims the term "voting-keys" when unqualified is intended to cover broadly any register-actuating devices which are shifted or otherwise moved by the voter in indicating his choice of candidates, and the term "registers" or "counters" is intended to cover broadly any suitable vote-registering mechanism.

I claim as my invention—

1. In a voting-machine, the combination of a case, voting mechanism arranged in said case and including voting-keys and a key-restoring mechanism, a pair of doors applied to the front of the case, means for securing one of said doors substantially at right angles to the front of the case, and means for transmitting the movement of the other door to said key-restoring mechanism, substantially as set forth.

2. In a voting-machine, the combination of a case, voting mechanism arranged in said case and including voting-keys and a key-restoring mechanism, a pair of doors applied to the front of the case, one of said doors being hinged to the case by swinging arms which permit the door, when open, to swing backwardly at an angle to the front wall of the case, means for transmitting the movement of the last-named door to said restoring mechanism, and means for securing the other door substantially at right angles to the front of the case, substantially as set forth.

3. In a voting-machine, the combination of a counter having its units-wheel provided with an actuating device, a rock-shaft having an arm adjacent to said device, a voting-key, and a rod operated by said key and movably connected with the arm of said rock-shaft and adapted to engage or clear the actuating device of the units-wheel, substantially as set forth.

4. In a voting-machine, the combination of a counter having its units-wheel provided with an actuating-arm, a rock-shaft having an arm arranged adjacent to said actuating-arm and provided with an opening, a voting-key, and a rod attached to said key guided in said opening and adapted to be shifted across the actuating-arm of the units-wheel for vibrating the same, substantially as set forth.

5. In a voting-machine, the combination of a face-plate or ballot-support, a series of voting-keys extending through said face-plate, a zero-setting shaft arranged on the rear side of said face-plate, a series of registers mounted on said shaft, and a rock-shaft arranged parallel with said resetting-shaft and provided with means for actuating the units-wheels of said registers, substantially as set forth.

6. In a voting-machine, the combination of a series of voting-keys each capable of being moved in opposite directions without restraint for permitting an elector to correct or change his vote, counters controlled by said keys, a universal shifting device having means constructed to move said keys in opposite directions for shifting the same into their voting position or restoring them to their initial position, and a party-key connected with said shifting device and capable of being moved manually in both directions, whereby said series of keys can be simultaneously and freely moved in either direction by said party-key, substantially as set forth.

7. A voting-machine, comprising a series of vote-indicators movable into and out of voting position and a unitary operating means common to said vote-indicators and operative to move the same into and out of voted position to change or correct a vote, substantially as set forth.

8. A voting-machine, comprising a series of individual-candidate-vote indicators movable into and out of voting position, operating means common to said vote-indicators and operative to move the same into and out of voted position, and a party-vote indicator for actuating said operating means, substantially as set forth.

9. In a voting-machine, the combination of a series of individual-voting keys, counters controlled by the same, a universal shifting device having forks arranged to engage said individual keys, respectively, the jaws of the forks being separated to permit a limited play of the individual keys between the same, and a party-key for operating said shifting device, substantially as set forth.

10. In a voting-machine, the combination of a series of pivoted individual-voting keys, counters controlled by the same, rock-shafts having shifting-forks arranged to engage said keys, respectively, a party-key, and a connection between the latter key and said rock-shaft, substantially as set forth.

11. In a voting-machine, the combination of a series of pivoted individual-voting keys, counters controlled by the same, rock-shafts arranged parallel with the pivots of said keys and carrying shifting devices for the same, respectively, and a party-key connected with said rock-shaft and pivoted to swing in a parallel plane with the individual keys, substantially as set forth.

12. In a voting-machine, the combination of a series of individual-voting keys pivoted to swing horizontally and representing candidates for different offices of the same party, counters controlled by said keys, an upright rock-shaft having shifting-forks arranged to engage said keys, respectively, and a party-key also pivoted to swing horizontally and operatively connected with said rock-shaft, substantially as set forth.

13. In a voting-machine, the combination of a series of individual-voting keys, counters controlled by the same, a universal shifting device for the series of voting-keys, a party-key for operating said shifting device, and a restoring device independent of said shifting device acting upon said party-key, substantially as set forth.

14. In a voting-machine, the combination of a series of individual-voting keys, counters controlled by the same, a universal shifting device for the series of voting-keys, a party-key for operating said shifting device, and a restoring-bar independent of said shifting device extending across the party-key and provided with a projection arranged to engage said key, substantially as set forth.

15. In a voting-machine, the combination of a voting-key, an indicating-slide having a portion arranged to appear or disappear and provided with an oblique slot, and a shifting-pin operated by said key and engaging in said slot, substantially as set forth.

16. In a voting-machine, the combination of a face-plate, a voting-key extending through the same, a horizontal slide having a portion arranged to appear and disappear through an aperture in said plate and provided with an oblique slot, a shifting pin engaging in said slot and arranged to be shifted in one direction by said key and a key-restoring device arranged to shift said pin in the opposite direction, substantially as set forth.

17. In a voting-machine, the combination of a face-plate, a series of individual-voting keys extending through said face-plate, registers controlled by said keys, an upright rock-shaft having an actuating-arm provided with a pin and a series of forks arranged to engage with said series of keys, a party-key also extending through the face-plate and engaging with the pin of said actuating-arm, an indicating-slide arranged adjacent to said party-key and having a portion which is adapted to appear or disappear, said slide being provided with an oblique slot which receives the pin of said actuating-arm, substantially as set forth.

18. In a voting-machine, the combination of a case provided in opposite walls with horizontal guides, shelves or trays removably arranged in said guides, a movable face-plate arranged in front of said shelves, a series of individual-voting keys and complementary registers mounted on each of said shelves, upright rock-shafts arranged in the case in rear of said shelves and provided with shifting-forks which engage said individual keys, and party-keys for operating said rock-shafts, substantially as set forth.

19. In a voting-machine, the combination of a number of voting-keys, a universal locking or limiting member coöperating with the series of keys, and individual locking devices intermediate of the keys and said limiting member operated by the keys and each provided with means for shifting said limiting member and a stop arranged to encounter said member, substantially as set forth.

20. In a voting-machine, the combination of a number of voting-keys, a universal limiting-bar therefor, and a rotary locking-wheel for each key actuated by the key and provided with an actuating projection for shifting the limiting-bar and a stop arranged to encounter said bar, substantially as set forth.

21. In a voting-machine, the combination of a number of voting-keys, a universal limiting-bar therefor provided with shifting-notches, and a rotary locking-wheel for each key actuated by the key and provided with an actuating-pin arranged to enter one of the notches of the limiting-bar and a stop-pin arranged to encounter said bar at one side of said notch, substantially as set forth.

22. In a voting-machine, the combination of a number of voting-keys, a universal limiting-bar therefor, and a rotary locking-wheel for each key actuated by the key and having means for shifting said limiting-bar and stops located on opposite sides of said shifting means and arranged to engage the bar for preventing rebound of the wheel at either extremity of its movement, substantially as set forth.

23. In a voting-machine, the combination of a number of voting-keys, a universal limiting-bar therefor provided with shifting-notches and on opposite sides of said notches with stop-notches, and a rotary locking-wheel for each key actuated by the key and provided with an actuating-pin adapted to engage with one of the shifting-notches of the limiting-bar and with a pair of stop-pins arranged to alternately enter the corresponding stop-notches of the bar, substantially as set forth.

24. In a voting-machine, the combination of a number of voting-keys, a universal limiting-bar therefor, a rotary locking-wheel for each key actuated by the key and having means for shifting said limiting-bar and stops located on opposite sides of said shifting means and arranged to engage the bar, and a detent engaging with said wheel, substantially as set forth.

25. In a voting-machine, the combination of two or more rows of group-voting keys, registers controlled by said keys, a locking-bar for each row of keys, and guide-arms for each of said locking-bars provided with extensions adapted to be detachably secured to the guide-arms of the adjacent locking bar or bars, substantially as set forth.

26. In a voting-machine, the combination of two or more sets of group-voting keys each set representing candidates of one party, registers controlled by said keys, a party-key coöperating with each of said sets of group-voting keys, and splitting-keys independent of said party-keys, whereby the keys of either of said sets may be collectively shifted to their ineffective position, substantially as set forth.

27. In a voting-machine, the combination of two or more sets of group-voting keys, each set representing candidates of one party, registers controlled by said keys, a rock-shaft for each of said sets having forks which engage with the respective keys of the set, and an operating-key for each of said rock-shafts, substantially as set forth.

28. In a voting-machine, the combination of a voting mechanism including rows of individual-voting keys and registers controlled by the same, a locking or limiting device for each row of keys, and a universal shaft having shifting means adapted to engage with one or more of said limiting devices, substantially as set forth.

29. The combination of voting mechanism including series of individual-voting keys and registers controlled by the same, locking or limiting devices, one for each series of keys, and a universal actuating device constructed to engage with one or more of said limiting devices, substantially as set forth.

30. In a voting-machine, the combination of a voting mechanism including rows of individual-voting keys and registers controlled by the same, a locking or limiting device for each row of keys, a rock-shaft having shifting-arms adapted to engage with one or more of said limiting devices, and means for actuating said rock-shaft from the outside of the machine, substantially as set forth.

31. In a voting-machine, the combination of a voting mechanism including horizontal rows of individual-voting keys and registers controlled by the same, a horizontally-movable locking-bar for each row of keys, and an upright rock-shaft provided with shifting-forks which engage with said locking-bars, substantially as set forth.

32. In a voting-machine, the combination of the case, voting mechanisms arranged therein and including voting-keys, and a movable face-plate—constructed to permit the actuation of the keys in one position of the plate and to prevent their actuation in another position of the plate, and automatic means whereby said plate after having been once shifted and locked is permanently locked against operation by an election officer, substantially as set forth.

33. In a voting-machine, the combination of the case, voting mechanisms arranged therein and including voting-keys, and a movable face-plate having slots for the passage of said keys, said slots being provided at one side with stop-shoulders arranged to block the keys in the abnormal position of the face-plate, substantially as set forth.

34. In a voting-machine, the combination of the case, voting mechanisms arranged in the case and including voting-keys, and a sliding face-plate having slots for the passage of the keys, each of said slots being provided with a transverse locking-notch adapted to receive the corresponding voting-key when the plate is shifted out of its normal position, substantially as set forth.

35. In a voting-machine, the combination of the case, voting mechanisms including voting-keys, a movable face-plate having slots for the passage of said keys and constructed to block and release the keys in different positions of the plate, a manual lock for said plate, and automatic means permitting one operation of said manual lock and thereafter permanently locking said face-plate against operation by an election officer, substantially as set forth.

36. In a voting-machine, the combination of a case, voting mechanisms including registers or counters, a movable plate or shutter constructed to expose and conceal the registers in different positions of the plate, and carrying a locking member, a locking-bolt adapted to engage with said member, an auxiliary locking device also adapted to engage with said locking member and arranged to be shifted into its operative position by said locking-bolt, substantially as set forth.

37. In a voting-machine, the combination of a case, voting mechanisms including registers or counters, a sliding plate or shutter constructed to expose and conceal the registers in different positions of the plate and provided with a locking projection, a locking-bolt adapted to engage with said projection in the normal position of said plate, a carrier arranged to be advanced with said bolt, and a tumbler mounted on said carrier and arranged to be held in its inoperative position by said projection and adapted to move into its operative position and block said projection when the bolt is retracted and the plate is shifted to its abnormal position, substantially as set forth.

38. In a voting-machine, the combination of a case, voting mechanisms including registers or counters, a sliding plate or shutter constructed to expose and conceal the registers in different positions of the plate and provided with a locking projection, a locking-bolt adapted to engage with said projection in the normal position of said plate, a carrier arranged to be advanced with said bolt, a tumbler pivoted to said carrier and arranged to be swung to its inoperative position by contact with said projection and to swing over said projection when the plate is shifted to its abnormal position, and means for retaining said carrier in its advanced position, substantially as set forth.

39. In a voting-machine, the combination of a case, voting mechanisms including registers or counters, a sliding plate or shutter constructed to expose and conceal the registers in different positions of the plate and provided with a locking projection, a locking-bolt adapted to engage with said projection in the normal position of said plate, a carrier arranged to be advanced with said bolt, a depending tumbler pivoted to said carrier and arranged to be swung out of its normal position by contact with said projection and to swing over the same when the plate is lowered to its abnormal position, and an automatic detent arranged to engage with said carrier in its advanced position, substantially as set forth.

40. In a voting-machine, the combination of a case, voting mechanism including voting-keys, a sliding face-plate constructed to block and release said keys in different positions of the plate and carrying a locking member, a locking-bolt adapted to engage with said member, and an auxiliary locking device also adapted to engage with said locking member and arranged to be shifted into its operative position by said locking-bolt, substantially as set forth.

41. In a voting-machine, the combination of the case, voting mechanism including voting-keys, a sliding face-plate constructed to block and release said keys in different positions of the plate and carrying a locking projection, a locking-bolt adapted to engage with said projection in the normal position of said plate, a carrier arranged to be advanced with said bolt, and a tumbler mounted on said carrier and arranged to be held in its inoperative position by said projection and adapted to move into its operative position and block said projection when the bolt is retracted and the plate is shifted to its abnormal position, substantially as set forth.

42. In a voting-machine, the combination of the case, voting mechanism including voting-keys, a sliding face-plate constructed to block and release said keys in different positions of the plate and carrying a locking projection, a locking-bolt adapted to engage with said projection in the normal position of said plate, a carrier arranged to be advanced by said bolt, a tumbler pivoted to said carrier and arranged to be swung to its inoperative position by contact with said projection and to swing over said projection when the plate is shifted to its abnormal position, and means for retaining said carrier in its advanced position, substantially as set forth.

43. In a voting-machine, the combination of a case, voting mechanisms including registers or counters, a resetting device for said registers accessible through an opening in the case, a shutter applied to said opening, and a lock for said shutter accessible only from the inside of the case, substantially as set forth.

44. In a voting-machine, the combination of a case, voting mechanisms including registers or counters, a resetting device for said registers accessible through an opening in the case, a shutter applied to said opening, a spindle passing through the wall of the case and said shutter and provided with an eccentric locking-pin engaging with the shutter, and a locking device for said spindle arranged inside of the case, substantially as set forth.

45. In a voting-machine, the combination of a case, voting mechanisms including registers or counters, a resetting device for said registers accessible through an opening in the case, a shutter applied to said opening and having a locking-slot, a spindle passing through the wall of the case and said slot and provided with an eccentric-pin adapted to engage against one edge of said slot, a locking-head secured to the inner end of the spindle, and a catch arranged inside of the case and adapted to interlock with said head, substantially as set forth.

46. In a voting-machine, the combination of a voting mechanism including voting keys and counters, a rock-shaft having arms adapted to actuate the units-wheels of the counters, a cam-lever connected with said rock-shaft, a key-restoring device, and an upright shaft or pintle having an arm arranged to engage with said cam-arm and said key-restoring device, substantially as set forth.

47. In a voting-machine, the combination of horizontal rows of counters, a rock-shaft arranged adjacent to each row of counters and having means for engaging the units-wheels thereof, a universal actuating-bar arranged in rear of said rock-shafts, and intermediate levers having their front ends connected with said rock-shafts and their rear ends with said universal bar, substantially as set forth.

Witness my hand this 14th day of November, 1902.

MARQUIS H. JOHNSON.

Witnesses:
CARL F. GEYER,
EMMA M. GRAHAM.